Feb. 14, 1933.   A. ZOPP   1,897,184
INDUCTION MOTOR
Filed May 3, 1930
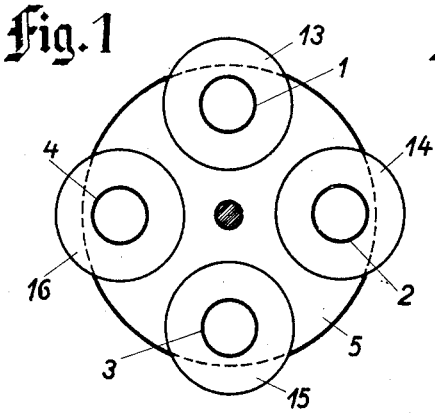
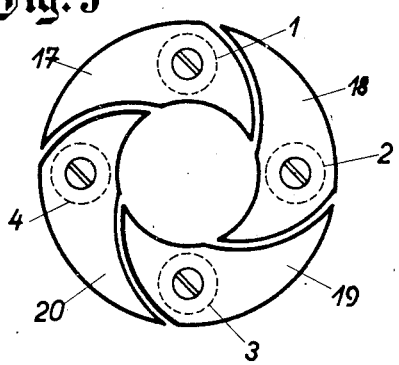
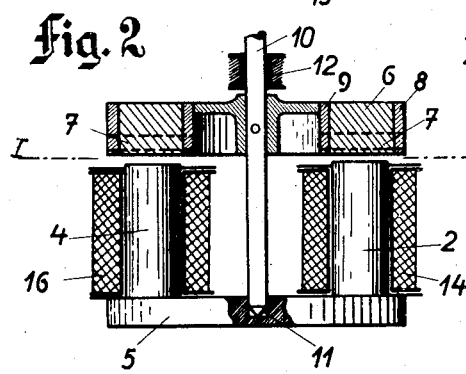
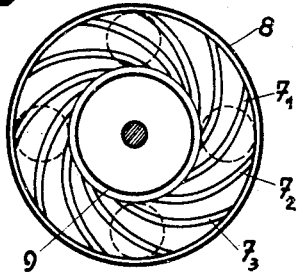
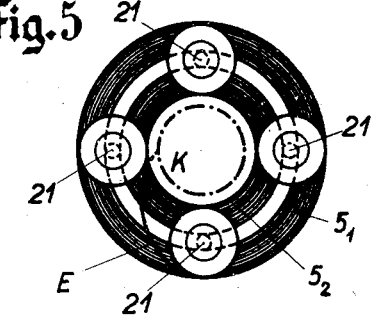
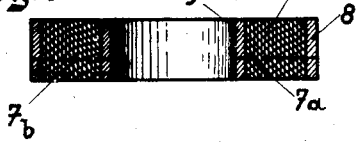
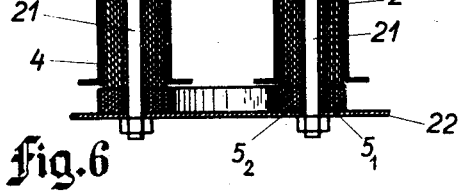
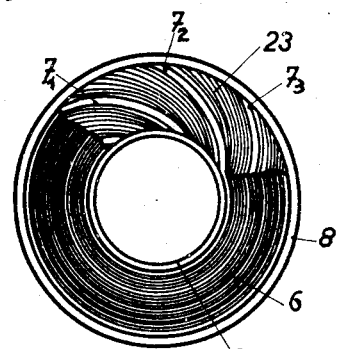
Inventor:
August Zopp
By Emil Bonnelycke
Attorney Patented Feb. 14, 1933

1,897,184

UNITED STATES PATENT OFFICE

AUGUST ZOPP, OF MODLING, NEAR VIENNA, AUSTRIA

INDUCTION MOTOR

Application filed May 3, 1930, Serial No. 449,481, and in Austria May 6, 1929.

This invention relates to a new and improved three-phase motor (induction motor) for small output. In the three-phase motors of the hitherto usual type of construction the making of the revolving field windings, which are generally accommodated in semiclosed slots in the stator, becomes increasingly difficult with the decrease in the size of the motor. For the most commonly used line voltages of 220 and 380 volts three-phase motors for an output of less than ¼ H. P. are for this reason seldom produced. A further reduction in output implies no appreciable reduction in the cost of production of the motor.

The present invention has for its object to effect a very considerable simplification in the construction of the windings and of the magnetic circuit (iron body) and thus to provide a three-phase motor capable of meeting the growing demand for motors of small and very small output.

The invention will be more readily understood with reference to the accompanying drawing, in which:—

Figure 1 is a diagrammatic top view of the motor according to the invention,

Fig. 2 is a side view partly in section of the motor of Fig. 1,

Fig. 3 is a top view of the pole shoes,

Fig. 4 is a top view showing the curved rotor bars,

Fig. 5 is a top view showing the construction of the motor,

Fig. 6 is a side view of the showing of Fig. 5,

Fig. 7 shows a detail in section of the rotor, and

Fig. 8 shows a top view of the rotor with the short circuiting rings.

Figs. 1 and 2 illustrate diagrammatically the construction of the motor in accordance with the invention for quarter phase A. C. or one-phase A. C. with auxiliary phase. The carrier of the magnetic field is represented in this case by four salient poles denoted by the reference numbers 1 to 4, of which each diametrically opposed pair belongs to one phase. The magnetic circuit is closed on the one side by the yoke plate 5, and on the other side by the rotor ring 6. The latter, on the side towards the poles, is traversed radially by a considerable number of copper bars 7, the ends of which are short-circuited to the two copper rings 8 and 9 (squirrel-cage rotor). The rotor is attached to the axle 10, and is rotatable together with the latter in the diagrammatically indicated bearings 11, 12.

The stator winding consists of four simple round coils 13-16. If these latter are connected to a quarter phase A. C. a revolving field is generated which rotates the rotor in the known manner. It is evident that the efficiency of a motor of this simplest type of construction will be very low, since the revolving field does not remain constant in extent, but is subject to powerful periodic variations on account of the distance between the poles. This drawback, which is still further increased when a plain metal disc is substituted for the short-circuited rotor is the main reason why this type of motor has hitherto acquired no technical or practical importance. This drawback, however, can be overcome in a dual manner, which characterizes the essential nature of the present invention, namely as follows:—

1. By the employment of pole-shoes of such a shape (pole-shoes denoted by the reference numbers 17 to 20 in Fig. 3) that a field distribution is obtained, which exactly coincides with the field shape of a winding distributed over a plurality of slots.

2. By the employment of curved rotor bars (denoted by $7^1$, $7^2$ and so forth in Fig. 4). By this means each rotor bar is caused to pass directly from the field of one pole into that of the adjacent pole.

In the practical realization of these principles it will be necessary in the great majority of cases to subdivide (laminate) the active iron of the motor. In this respect also a considerable simplification of the process of manufacture, at all events in regard to the stator iron and the assembling of the same in a casing, is achieved by the present invention. To this end the cores are formed by the winding of strip iron on a pin (roll cores).

The yoke is similarly made by the winding of a proportionately narrower strip, and is preferably divided into two concentric rings ($5_1$ and $5_2$ in Figs. 5 and 6). The roll cores and the yoke rings are secured to the base plate 22 of the casing by means of the screws 21. The sub-division of the pole-shoes is preferably carried out according to involutes E of a circle, the basic circle K of which is so determined that the separate plates, without actually bridging any two consecutive poles, yet approach as near as possible to the latter.

The active iron of the rotor can also be formed of wound strip, which is held in position by the short-circuiting rings (see the diametral section shown in Fig. 7). At the side towards the poles either slots ($7_a$) are milled or holes ($7_b$) drilled radially for the reception of the rotor bars (for the rotor of the type shown in Fig. 2). The type of rotor shown in Fig. 4 is particularly suitable for subdividing the iron rotor. Between the two short-circuiting rings 8 and 9 (Fig. 8) the slightly narrower roll yoke 6 is first pressed. On top of this spirally wound yoke, narrow involute bundles 23 of thin iron leaves of equal breadth and the similarly curved copper bars $7_1$, $7_2$, $7_3$ etc. are alternately inserted. At first the bundles and the bars can be inserted and arranged in order without the application of force. But as soon as the annular space is almost filled a considerable strain is set up between the leaves, so that the last of the bundles or the last of the copper bars can be pressed into place only by the exercise of great force in an axial direction. The rotor thus produced requires no further mechanical means of consolidation (riveting or the like); for the purposes of turning or grinding the same behaves as a solid piece. The bars $7_1$, $7_2$ etc. must be conductively connected, e. g. soldered, to the short-circuiting rings 8, 9 for electrical reasons only.

The number of salient poles required for a motor depends on the number of the phases of the alternating current available and on the speed required. For three phase current three salient poles are sufficient, though motors with six salient poles, of which each diametrically opposed pair is magnetically connected in series and belongs to one phase, show better performance.

Some of the advantages of the motor provided by the present invention over the types already existing are as follows:—

1. The possibility of employing simple round coils, which can easily be produced by machinery, providing a great saving of time.

2. The possibility of effective insulation of the stator windings, which on the one hand enables induction motors to be produced economically even for very low outputs, and on the other hand enables motors to be built for direct connection to higher working voltages.

3. Stamping dies are not required either for the stator or for the rotor; this provides the greatest possible freedom in the dimensioning of the motor, that is to say easy adaptation of the form and size of the motor to the space available for the mounting of the latter and to the required output.

What I claim is:—

1. An induction motor having an iron stator element which comprises spaced individual pole cores secured to a yoke ring and a rotor element magnetically bridging the spaces between said cores, one of said elements comprising a substantially annular iron member which is subdivided by slots which extend substantially normal to the air gap and which cross the annular member at other than right angles to the direction of movement of the rotor surface, said annular iron member being interposed in the magnetic circuit in such position that one surface thereof forms one side of the air gap and thus serving to distribute the magnetic flux generated in the stator, whereby said flux can develop freely and higher harmonics in the rotor are suppressed.

2. An induction motor as in claim 1 wherein the substantially annular iron member consists of pole shoes of the stator poles.

3. An induction motor as in claim 1 wherein the substantially annular iron member forms a part of the rotor, and wherein the rotor inductors are located in the slots thereof.

4. An induction motor as in claim 1 wherein the substantially annular iron member forms a part of the rotor, and wherein the said rotor comprises inductors curved as involute arcs arranged between sheet iron elements of corresponding shape, and supported between two short circuiting rings.

5. An induction motor as in claim 1 in which the stator pole cores as well as the rotor core comprise rolled up strips of iron, whereby it becomes feasible to employ laminated iron for the entire magnetic circuit.

6. An induction motor as in claim 1 wherein that surface of the substantially annular iron member which forms one side of the air gap is plane, the slots being cut substantially normal to said surface, and arranged non-radially therein with respect to the axis of rotation of the rotor.

In testimony whereof I affix my signature.

AUGUST ZOPP.